United States Patent
Stevenson et al.

(10) Patent No.: US 6,814,531 B2
(45) Date of Patent: Nov. 9, 2004

(54) ROTATION RESTRAINING SELF-PIERCING RIVET

(75) Inventors: Robin Stevenson, Bloomfield, MI (US); Pei-Chung Wang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 87 days.

(21) Appl. No.: 10/298,969

(22) Filed: Nov. 18, 2002

(65) Prior Publication Data

US 2004/0096296 A1 May 20, 2004

(51) Int. Cl.$^7$ .............................. F16B 19/08; F16B 37/04

(52) U.S. Cl. ........................ 411/501; 411/179; 411/452

(58) Field of Search ................................ 411/179, 180, 411/181, 452, 500, 501, 504

(56) References Cited

U.S. PATENT DOCUMENTS

| | | | | |
|---|---|---|---|---|
| 4,650,373 A | * | 3/1987 | Seegmiller | 411/452 X |
| 5,207,588 A | * | 5/1993 | Ladouceur et al. | 411/181 X |
| 5,564,873 A | * | 10/1996 | Ladouceur et al. | 411/179 X |
| 5,575,601 A | | 11/1996 | Skufca et al. | |
| 5,613,815 A | * | 3/1997 | Muller | 411/181 |
| 6,325,584 B1 | | 12/2001 | Marko et al. | |

* cited by examiner

Primary Examiner—Neill Wilson
(74) Attorney, Agent, or Firm—Kathryn A. Marra

(57) ABSTRACT

The present invention is a self-piercing rivet wherein the hollow shell has an external axial asymmetry wherein the asymmetry is with respect to the axis of rotation of the hollow shell. Once installed in a stack of sheets, the asymmetric self-piercing rivet prevents relative sheet rotation of the sheets relative to the axis because of rotational interference caused by the external axial asymmetry of the hollow shell.

5 Claims, 3 Drawing Sheets

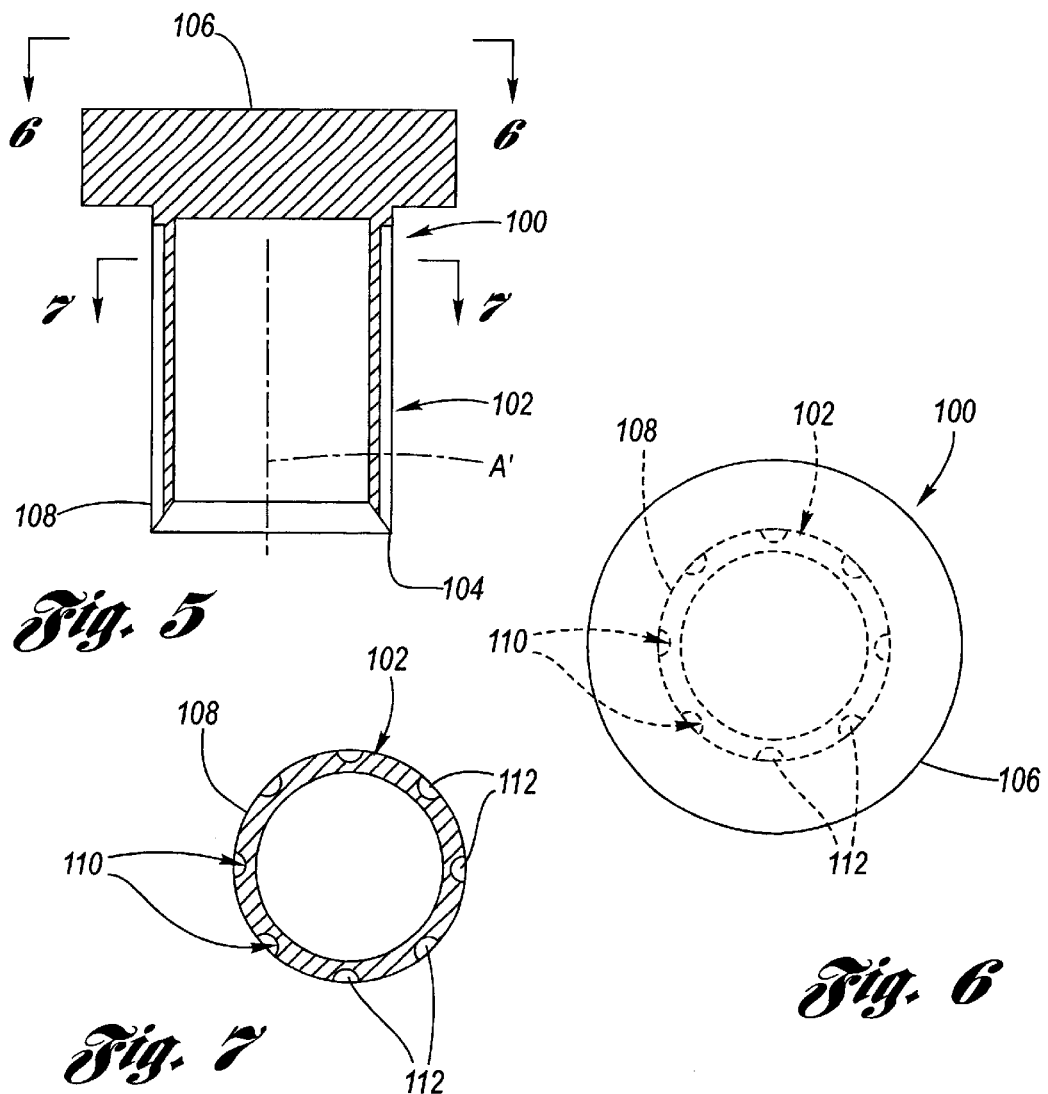
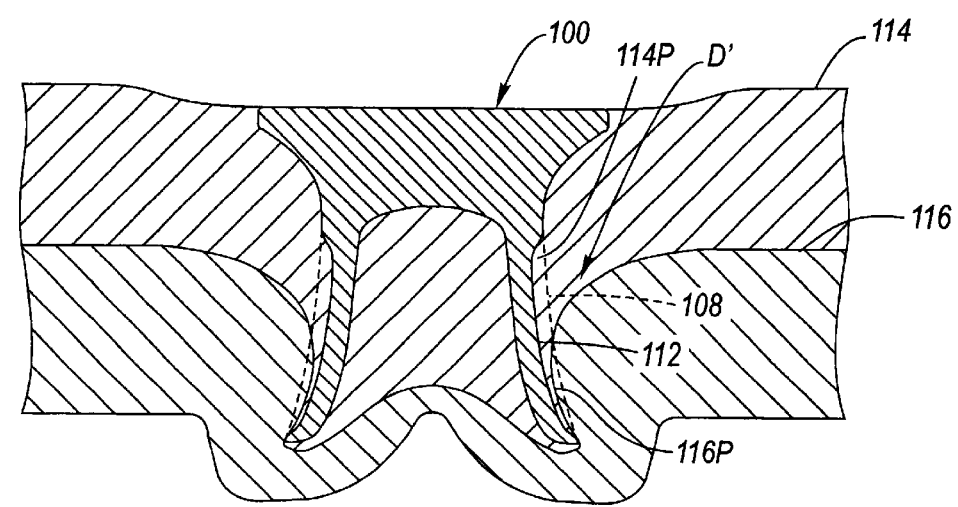

ROTATION RESTRAINING SELF-PIERCING RIVET

TECHNICAL FIELD

The present invention relates to self-piercing rivets used to join together metallic sheets, and more particularly to a self-piercing rivet having features which inhibit rotation of the rivet with respect to the metallic sheets joined thereby.

BACKGROUND OF THE INVENTION

The joining of metallic sheets can be accomplished by various mechanical modalities, as for example, threaded fasteners, rivets and welding. The modality used depends upon the application. One type of rivet having an excellent ability to join together a stack of metallic sheets is a self-piercing rivet.

Various aspects of a prior art self-piercing rivet are shown at FIGS. 1 through 4. A self-piercing rivet 10 has a hollow shell 12 of cylindrical shape which is closed at one end by an overhanging head 14 and which has at the opposite end a point 16. A ram 18 and opposing die 20 are used to drive the self-piercing rivet 10, point 16 first, into two or more sheets 22, typically a metal, such as for example aluminum. The ram 18 has a convex contour 24 and the die has a concave contour 26, such that after stroking of the ram, the hollow shell 12 pierces the sheets 22 with a deformation D defined by the concave contour 26 and wherein the head 14 is countersunk by the convex contour 24. The deformation D involves a bending of the hollow shell 12 outwardly so as to lock the self-piercing rivet 10 in position with respect to the sheets 22 such as to prevent its removal from the sheets and, as a result, any possible disjoinder of the sheets.

It will be noticed that the deformation D, while preventing the self-piercing rivet and the sheets 22 from releasing from one another, involves a circular symmetry about the shell axis A of the hollow shell 12. Because of this a circular symmetry, there is the possibility that, in spite of rivet clamping and the resultant high frictional forces which are present, the sheets 22 may, over time, rotatively wander relative to each other and one or more with respect to the self-piercing rivet. The possibility of rotational wandering of the sheets relative to each other can be undesirable in a number of self-piercing rivet applications.

Accordingly, what is needed in the art is some way to prevent rotational wandering of sheets joined by a self-piercing rivet.

SUMMARY OF THE INVENTION

The present invention is a self-piercing rivet wherein the hollow shell has an external axial asymmetry wherein the asymmetry is with respect to the centerline axis of the hollow shell (or simply put, the shell axis). Once installed in a stack of sheets, the asymmetric self-piercing rivet prevents relative sheet rotation of the sheets relative to the shell axis because of rotational interference caused by the external axial asymmetry of the hollow shell.

A preferred external axial asymmetry of the hollow shell is provided by the exterior surface of the hollow shell having irregular surface features which are oriented generally parallel to the shell axis. The irregular surface features may be either protruding surface features, such as for example ribs, or intruding surface structures, such as for example flutes (i.e., grooves or slots). In operation, as the asymmetric self-piercing rivet is driven into a plurality of sheets (composed of for example metal or metal composite) to be joined, the irregular surface features interact with the sheets such that after joinder, the sheets are prevented from relative rotation because of an interference fit between the sheets and the irregular surface features.

The external axial asymmetry can be provided alternatively, or in addition to the aforementioned surface irregularity features, by any geometrical configuration of the hollow shell which is non-circular with respect to the shell axis, as for example an oval or square geometry with respect to the shell axis of rotation of the hollow shell.

Accordingly, it is an object of the present invention to provide a self-piercing rivet having an external axial asymmetry which serves to prevent relative rotation of sheets joined thereby.

This and additional objects, features and advantages of the present invention will become clearer from the following specification of a preferred embodiment.

BRIEF DESCRIPTION OF THE DRAWINGS

FIG. 5 is a side view of an axially asymmetrical self-piercing rivet according to the present invention; wherein the axial asymmetry is provided by a plurality of external surface irregularities in the form of a plurality of axially oriented flutes.

FIG. 6 is a top end view of the axially asymmetric self-piercing rivet, seen along line 6—6 of FIG. 5.

FIG. 7 is a sectional view of the axially asymmetric self-piercing rivet, seen along line 7—7 of FIG. 5.

FIG. 8 is a sectional side view of a stack of sheets and the axially asymmetric self piercing rivet of FIG. 5, showing the rivet joinder thereby created.

DESCRIPTION OF THE PREFERRED EMBODIMENT

Figure 1:
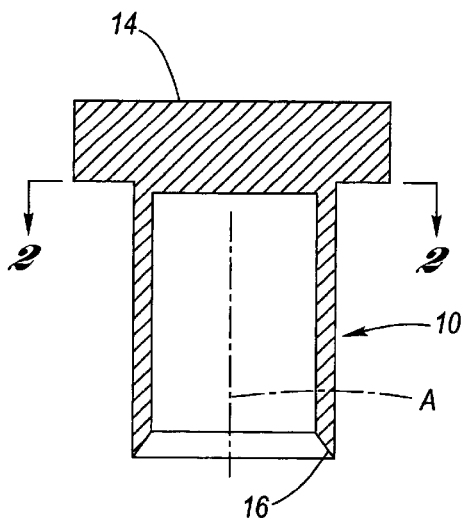
FIG. 1 is a sectional side view of a prior art self-piercing rivet.
Figure 2:
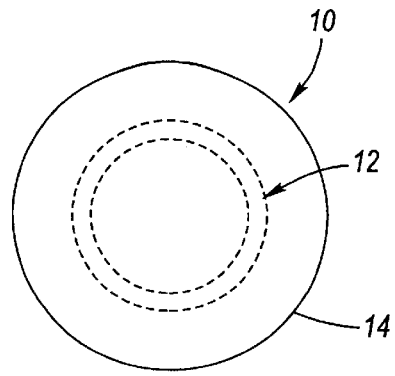
FIG. 2 is a top end view of the self-piercing rivet, seen along line 2—2 of FIG. 1.

Referring now to the Drawing, FIGS. 5 through 11 depict various aspects and examples of an axially asymmetric self-piercing rivet according to the present invention.

Referring firstly to FIGS. 5 through 8, a first preferred axially asymmetric self-piercing rivet 100 is depicted. The hollow cylinder 102 has an axis of rotation (shell axis) A' and terminates at one end in a point 104 and at the opposite end is connected to a head 106 which is oriented transversely with respect to the shell axis A'. The head 106 has a larger diameter than that of the hollow cylinder such that it overhangs the hollow cylinder.

External axial asymmetry of the hollow shell 102 is provided by the exterior surface 108 of the hollow shell having a plurality of irregular surface features 110 which are oriented parallel to the shell axis A' and radially intrude into the exterior surface, such as for example flutes 112. The flutes 112 may be of any shape, preferably circularly concave. By way of example, there may be eight flutes equally spaced apart circumferentially around the exterior surface 108.

Figure 3:
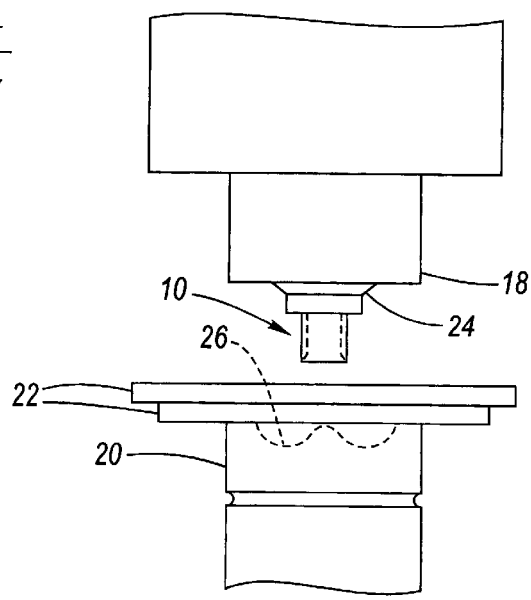
FIG. 3 is a schematic side view of a prior art ram and die mechanism, shown operative with respect to a prior art self-piercing rivet and a stack of sheets to be riveted.

In operation, the asymmetric self-piercing rivet 100 is placed at the ram of a ram and die mechanism as generally depicted at FIG. 3, and sheets of metal or metal composite (i.e., aluminum sheets) 114, 116 are stacked at the die and the ram is then stroked. FIG. 8 depicts an example of the deformation D' resulting from the ram and die mechanism driving the asymmetric self-piercing rivet into the sheets. As can be discerned by this exemplification, each sheet 114, 116 has a respective portion 114p, 116p which has intruded radially inward with respect to the exterior surface 108 into the flutes 112. As a result, an interference fit between the sheets and the asymmetric self-piercing rivet is established which prevents relative rotation of the sheets.

Figure 9:
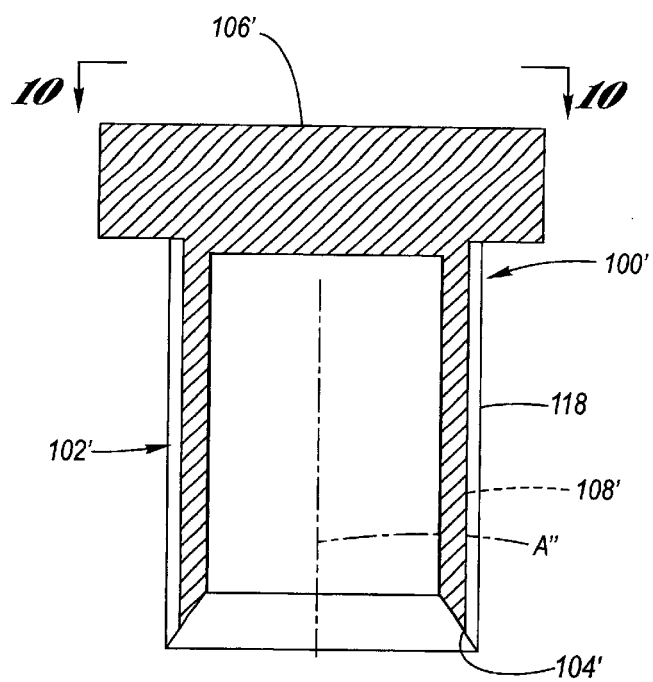
FIG. 9 is a side view of a second preferred axially asymmetrical self-piercing rivet according to the present invention, wherein the axial asymmetry is provided by a plurality of external surface irregularities in the form of a plurality of axially oriented ribs.
Figure 10:
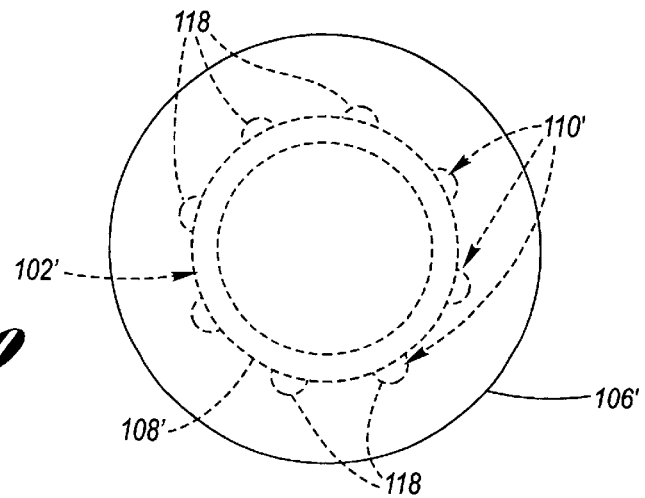
FIG. 10 is a top end view of the second preferred axially asymmetric self-piercing rivet, seen along line 10—10 of FIG. 9.

Referring next to FIGS. 9 and 10, a second preferred axially asymmetric self-piercing rivet 100' is depicted. As in FIG. 5, the hollow cylinder 102' has an axis of rotation (shell axis) A'' and terminates at one end in a point 104' and is connected to a head 106' which is transversely oriented relative to the shell axis A''. The head 106' has a larger diameter than that of the hollow cylinder such that it overhangs the hollow cylinder.

External axial asymmetry of the hollow shell 102' is now provided by the exterior surface 108' of the hollow shell having a plurality of irregular surface features 110' which are oriented parallel to the shell axis A'' and radially protrude from the exterior surface, such as for example ribs 118. The ribs 118 may be of any shape, preferably circularly convex. By way of example, there may be eight ribs equally spaced apart circumferentially around the exterior surface 108'.

In operation, the asymmetric self-piercing rivet 100' is placed at the ram of a ram and die mechanism as generally depicted at FIG. 3, and sheets of metal or metal composite (i.e., aluminum sheets) are stacked at the die and the ram is then stroked. The deformation resulting from the ram and die mechanism driving the asymmetric self-piercing rivet into the sheets is similar to that shown at FIG. 8 except that now each sheet has respective portions which are invaded by the ribs 118 in a direction which is radially outward with respect to the exterior surface 108'. As a result, an interference fit between the sheets and the asymmetric self-piercing rivet is established which prevents relative rotation of the sheets.

Figure 11:
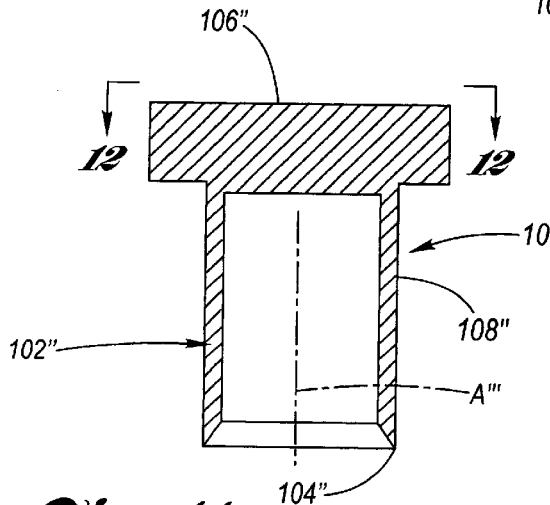
FIG. 11 is a side view of a third preferred axially asymmetrical self-piercing rivet according to the present invention, wherein the axial asymmetry is provided by an asymmetrical geometry of the hollow shell.
Figure 12:
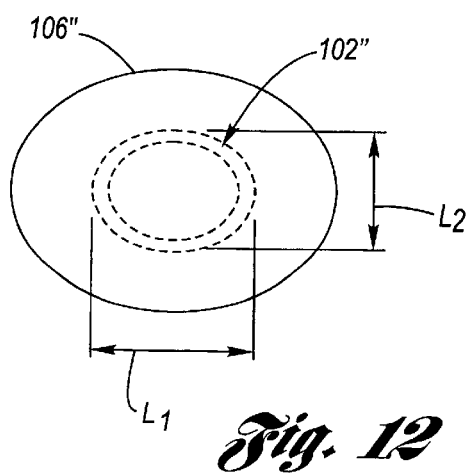
FIG. 12 is a top end view of the third preferred axially asymmetric self-piercing rivet, seen along line 12—12 of FIG. 11.

Referring lastly to FIGS. 11 and 12, a third preferred axially asymmetric self-piercing rivet 100'' is depicted. A hollow cylinder 102'' has a shell axis A''' and terminates at one end in a point 104'' connected to a head 106'' which is transversely oriented relative to the shell axis A'''.

The external axial asymmetry of the hollow shell 102'' is provided by the exterior surface 108'' of the hollow shell having any axially asymmetric geometrical configuration of the hollow shell which is not circular with respect to the shell axis A'''. While an oval shape of the hollow shell, which serves also to improve mechanical strength at the joinder, is shown at FIG. 12, wherein L1>L2, other shapes are possible, such as triangles, squares, hexagons, etc. The head 106'' is connected in transverse orientation to the hollow shell 102'' opposite the point 104'', and overhangs the hollow shell. The shape of the head may be similar to the non-circular shape of the hollow shell (as shown at FIG. 12) or may be circular irrespective of the shape of the hollow shell.

Figure 4:
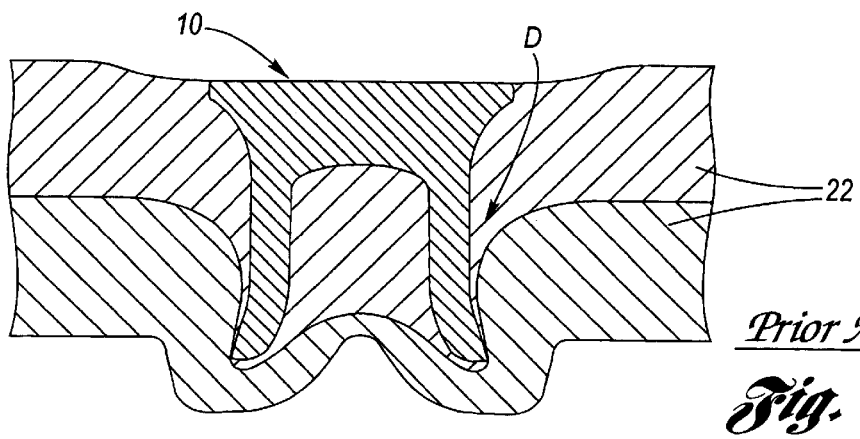
FIG. 4 is a sectional side view of the stack of sheets and prior art self-piercing rivet of FIG. 3, showing the rivet joinder created after the ram has stroked.

In operation, the asymmetric self-piercing rivet 100'' is placed at the ram of a ram and die mechanism as generally depicted at FIG. 3, and sheets of metal or metal composite (i.e., aluminum sheets) are stacked at the die and the ram is then stroked. The deformation D' resulting from the ram and die mechanism driving the asymmetric self-piercing rivet into the sheets may resemble that shown at FIG. 4, except that now the non-circular shape of the hollow shell is imparted to the deformation such that an interference between the sheets and the self-piercing rivet is established which prevents relative rotation of the sheets.

The first and second preferred axially asymmetric self piercing rivets 100, 100' have an advantage over the third preferred axially asymmetric self-piercing rivet 100'' in that no modification of the aforementioned ram and die mechanism would be needed with respect to interchangeability with conventional self-piercing rivets 10.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. An axially asynmmetric self-piercing rivet for riveting together at least two sheets, comprising:

a hollow shell having an axis of rotation, said hollow shell having a first end and an opposite second end, a sharp edge being located at said first end, said hollow shell having an exterior surface, said external surface having an asymmetry with respect to said axis extending substantially entirely between said first and second ends; and a head connected with said second end of said hollow shell at a transverse relation with respect to said axis;

wherein said hollow shell is structured to circumferentially expand at said first end into the at least two sheets.

2. The rivet of claim 1, wherein said asymmetry comprises a plurality of irregular surface features extending substantially between said first and second ends, each irregular surface feature of said plurality of surface features having an orientation substantially parallel with respect to said axis.

3. The rivet of claim 2, wherein said plurality of irregular surface features comprises a plurality of ribs, the ribs of said plurality of ribs being mutually spaced apart around said external surface of said hollow shell.

4. The rivet of claim 2, wherein said plurality of irregular surface features comprises a plurality of flutes, the flutes of said plurality of flutes being mutually spaced apart around said external surface of said hollow shell.

5. The rivet of claim 1, wherein said asymmetry comprises a preselected geometrical shape of said external surface extending substantially between said first and second ends which is non-circular with respect to said axis.

* * * * *